(12) United States Patent
Ly et al.

(10) Patent No.: US 11,477,783 B2
(45) Date of Patent: Oct. 18, 2022

(54) UPLINK BASED MOBILITY

(71) Applicant: QUALCOMM Incorporated, San Diego, CA (US)

(72) Inventors: Hung Ly, San Diego, CA (US); Heechoon Lee, San Diego, CA (US); Keiichi Kubota, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 980 days.

(21) Appl. No.: 15/462,510

(22) Filed: Mar. 17, 2017

(65) Prior Publication Data
US 2018/0092094 A1  Mar. 29, 2018

Related U.S. Application Data

(60) Provisional application No. 62/405,818, filed on Oct. 7, 2016, provisional application No. 62/399,804, filed on Sep. 26, 2016.

(51) Int. Cl.
*H04W 72/04* (2009.01)
*H04W 8/26* (2009.01)
(Continued)

(52) U.S. Cl.
CPC ....... *H04W 72/0453* (2013.01); *H04L 5/0055* (2013.01); *H04W 8/26* (2013.01);
(Continued)

(58) Field of Classification Search
CPC . H04W 72/0453; H04W 16/32; H04W 68/02; H04W 72/0413; H04W 48/16;
(Continued)

(56) References Cited

U.S. PATENT DOCUMENTS 8,576,742 B2  11/2013  Yoo et al.
9,350,397 B2  5/2016  Kang et al.
(Continued)

FOREIGN PATENT DOCUMENTS

CN  101931984 A  12/2010
CN  102291204 A  12/2011
(Continued)

OTHER PUBLICATIONS

International Search Report and Written Opinion—PCT/US2017/047974—ISA/EPO—dated Nov. 22, 2017.
(Continued)

*Primary Examiner* — Joshua L Schwartz
(74) *Attorney, Agent, or Firm* — Qualcomm Incorporated

(57) ABSTRACT

Systems and methods for enabling and providing uplink based mobility procedures are disclosed. Embodiments provide uplink based mobility procedures in which one or more physical channel typically used to facilitate uplink based mobility is not utilized. For example, an uplink based mobility process of embodiments utilizes a UL-based mobility specific ID and/or synchronization signals to provide information for decoding signals avoiding the use of physical cell identifier channel (PCICH). Embodiments of an uplink based mobility process utilize a physical channel, such as a physical slot format indication channel (PSFICH) or a physical downlink control channel (PDCCH), to provide uplink mobility signal acknowledgements and paging indications avoiding the use of a physical keep alive channel (PKACH).

14 Claims, 10 Drawing Sheets

FIG. 7B

(51) Int. Cl.
*H04L 5/00* (2006.01)
*H04W 16/32* (2009.01)
*H04W 68/02* (2009.01)
*H04W 48/16* (2009.01)
*H04W 74/08* (2009.01)

(52) U.S. Cl.
CPC ............ *H04W 16/32* (2013.01); *H04W 68/02* (2013.01); *H04W 72/0413* (2013.01); *H04W 48/16* (2013.01); *H04W 72/0446* (2013.01); *H04W 74/0833* (2013.01)

(58) Field of Classification Search
CPC .......... H04W 72/0446; H04W 74/0833; H04L 5/055
USPC .......................................................... 455/450
See application file for complete search history.

(56) References Cited

U.S. PATENT DOCUMENTS

| | | | |
|---|---|---|---|
| 9,426,673 | B2 | 8/2016 | Chen et al. |
| 9,730,164 | B2 | 8/2017 | Xu et al. |
| 2011/0310822 | A1* | 12/2011 | Nair ........................ H04W 8/26 370/329 |
| 2012/0281566 | A1* | 11/2012 | Pelletier ................ H04W 76/27 370/252 |
| 2015/0003263 | A1 | 1/2015 | Senarath et al. |
| 2016/0037420 | A1 | 2/2016 | Gaal et al. |
| 2016/0044710 | A1* | 2/2016 | Lee ........................ H04W 76/14 370/312 |
| 2016/0142957 | A1* | 5/2016 | Hu ........................ H04W 48/20 370/331 |
| 2016/0192253 | A1 | 6/2016 | Fischer |
| 2016/0278032 | A1 | 9/2016 | Yi et al. |

FOREIGN PATENT DOCUMENTS

| | | |
|---|---|---|
| CN | 104205915 A | 12/2014 |
| CN | 104272671 A | 1/2015 |
| EP | 2234420 A1 | 9/2010 |
| EP | 2988542 A1 | 2/2016 |
| WO | WO-2012047909 | 4/2012 |
| WO | WO-2013116270 | 8/2013 |

OTHER PUBLICATIONS

Qualcomm Incorporated, "High Speed Mobility Performance Evaluations", 3GPP Draft, R1-166393, High Speed Mobility Performance Evaluations, 3rd Generation Partnership Project (3GPP), Mobile Competence Centre, 650, Route Des Lucioles, F-06921, Sophia-Antipolis Cedex, France, RAN WG1, Gothenburg, Sweden, Aug. 22, 2016-Aug. 26, 2016, Aug. 21, 2016 (Aug. 21, 2016), 9 pages, XP051125355, Retrieved from the Internet: URL:http://www.3gpp.org/ftp/Meetings3GPPSYNC/RAN1/Docs/ [retrieved on Aug. 21, 2016].

Qualcomm Incorporated, "Uplink Based Mobility Physical Channels", 3GPP Draft, R1-166387, 3$^{rd}$ Generation Partnership Project (3GPP), Mobile Competence Centre, 650, Route Des Lucioles, F-06921, Sophia-Antipolis Cedex, France, RAN WG1, Gothenburg, Sweden, Aug. 22, 2016-Aug. 26, 2016, Aug. 21, 2016 (Aug. 21, 2016), 5 pages, XP051125354, Retrieved from the Internet: url:http://www.3gpp.org/ftp/Meetings3GPPSYNC/RAN1%20/Docs/ [retrieved on Aug. 21, 2016].

Span style="font-family: calibri;">Huawei: "Discussion on OTDOA Enhancements Using TP-Specific Signal Sequences", R3-152097, 3GPP TSG-RAN WG3 Meeting #89bis, Sophia Antipolis, France, Oct. 5-9, 2015, pp. 1-13.

Motorola Mobility, "Uplink Control Signaling for UL CoMP", 3GPP TSG RAN1#70, 3GPP Draft, R1-123793, 3rd Generation Partnership Project (3GPP), Mobile Competence Centre, 650, Route Des Lucioles, F-06921 Sophia-Antipolis Cedex, France, vol. RAN WG1, No. Qingdao, Aug. 13, 2012-Aug. 17, 2012, Aug. 5, 2012 (Aug. 5, 2012), XP050661646, 4 Pages. Retrieved from the Internet: URL: http://www.3gpp.org/ftp/tsg_ran/WG1_RL1/TSGR1_70/Docs/. [Retrieved on Aug. 5, 2012].

Qualcomm Incorporated, "DL and UL Based Mobility Procedures", 3GPP Draft, 3GPP TSG-RAN WG1 #86, R1-166386, 3rd Generation Partnership Project (3GPP), Mobile Competence Centre, 650, Route Des Lucioles, F-06921, Sophia-Antipolis Cedex, France, RAN WG1, Gothenburg, Sweden, Aug. 22, 2016-Aug. 26, 2016, Aug. 21, 2016 (Aug. 21, 2016), 4 pages, XP051125353, Retrieved from the Internet: URL:http://www.3gpp.org/ftp/Meetings3GPPSYNC/RAN1/Docs/ [retrieved on Aug. 21, 2016].

Weimin L., "Mobility Management Under LTE Idle State", Data Communication, Dec. 28, 2011, 4 Pages.

* cited by examiner

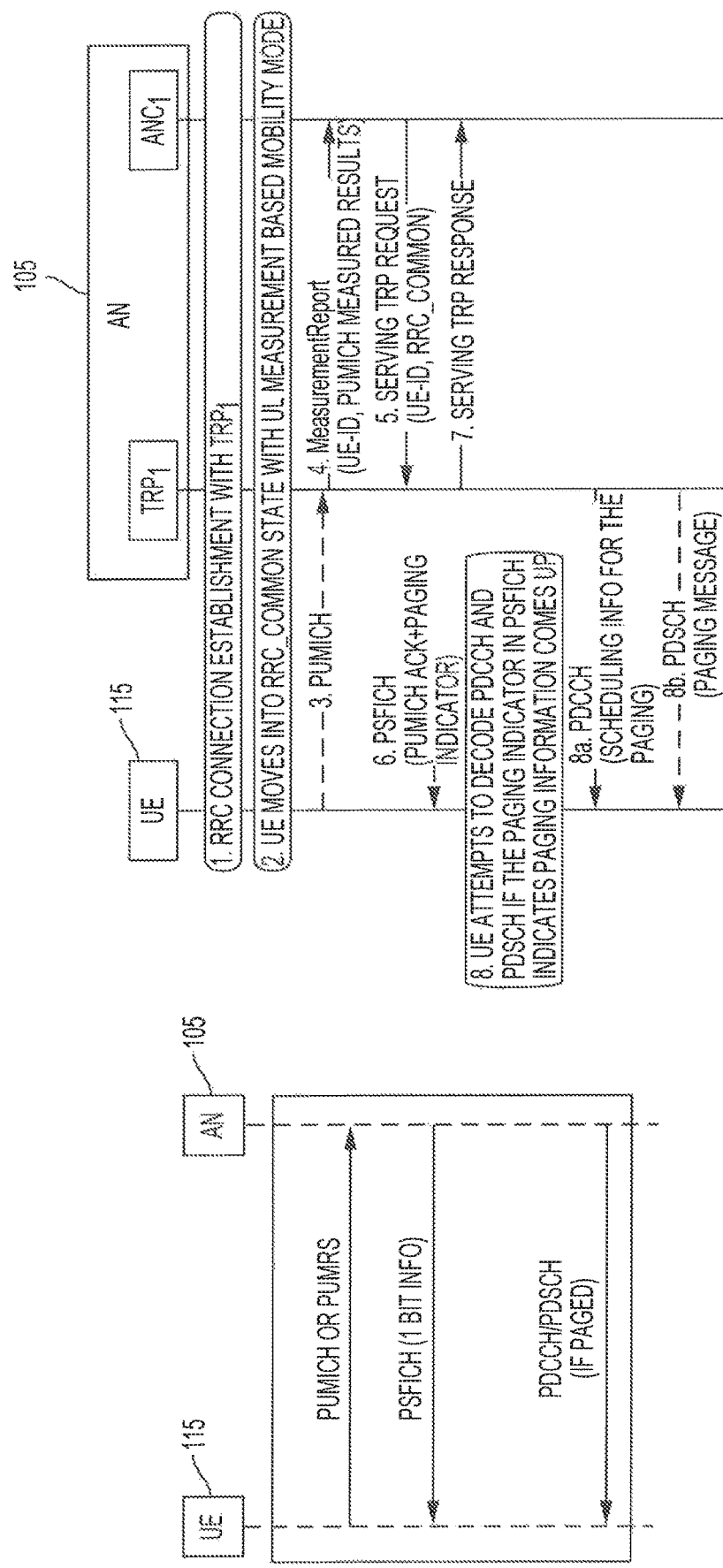

UPLINK BASED MOBILITY

CROSS-REFERENCE TO RELATED APPLICATIONS

This application claims the benefit of and priority to U.S. Provisional Patent Application No. 62/405,818, entitled, "UPLINK BASED MOBILITY," filed on Oct. 7, 2016 and U.S. Provisional Patent Application No. 62/399,804, entitled, "VIRTUAL PHYSICAL CELL IDENTIFICATION (PCI) FOR SUPPORTING UPLINK-BASED MOBILITY," filed on Sep. 26, 2016, the disclosures of which are hereby incorporated by reference herein in their entirety as if fully set forth below and for all applicable purposes.

TECHNICAL FIELD

Aspects of the present disclosure relate generally to wireless communication systems, and more particularly, to uplink based mobility. Certain embodiments of the technology discussed below can enable and further optimize uplink based mobility utilizing one or more abstracted or virtualized communication resources, such as uplink-based mobility specific identification, and/or alternative methods for the network to signal information in supporting the uplink based mobility.

INTRODUCTION

Wireless communication networks are widely deployed to provide various communication services such as voice, video, packet data, messaging, broadcast, and the like. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

Wireless communication systems aim to seek a balance of efficient use of power resources, network flexibility, and system performance. One area of interest is different approaches enabling mobility (e.g., movement of wireless communication devices, such as UEs, while maintaining the ability to support communication services) in wireless networks. Some approaches to enabling mobility in wireless networks have included downlink mobility, such as where the base station transmits reference signals (RSs) and the UEs perform cell search and measurements. Other approaches to enabling mobility in wireless networks have included uplink based mobility, such as where the UE sends RSs and the base station performs UE search and measurements.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In accordance with embodiments of the disclosure, a method for providing uplink based mobility operation of user equipment (UE) operable in a wireless network is provided. The method of embodiments includes obtaining, by the UE, uplink-based (UL-based) mobility specific identification (ID) information in association with an uplink mobility procedure facilitating mobility of the UE in the wireless network. The method of embodiments further includes utilizing, by the UE, the UL-based mobility specific ID information for decoding signals transmitted to the UE in operation of the uplink mobility procedure.

In accordance with further embodiments of the disclosure, an apparatus for providing uplink based mobility operation of user equipment (UE) operable in a wireless network is provided. The apparatus includes at least one processor, and a memory coupled to the processor. The at least one processor of embodiments is configured to obtain UL-based mobility specific ID information in association with an uplink mobility procedure facilitating mobility of the UE in the wireless network. The at least one processor of embodiments is further configured to utilize the UL-based mobility specific ID information for decoding signals transmitted to the UE in operation of the uplink mobility procedure.

In accordance with still further embodiments of the disclosure, a non-transitory computer-readable medium having program code recorded thereon for providing uplink based mobility operation of user equipment (UE) operable in a wireless network is provided. The program code of embodiments includes code to obtain UL-based mobility specific ID information in association with an uplink mobility procedure facilitating mobility of the UE in the wireless network. The program code of embodiments further includes code to utilize the UL-based mobility specific ID information for decoding signals transmitted to the UE in operation of the uplink mobility procedure.

In accordance with still further embodiments of the disclosure, an apparatus for providing uplink based mobility operation of user equipment (UE) operable in a wireless network is provided. The apparatus of embodiments includes means for obtaining, by the UE, UL-based mobility specific ID information in association with an uplink mobility procedure facilitating mobility of the UE in the wireless network. The apparatus of embodiments further includes means for utilizing, by the UE, the UL-based mobility specific ID information for decoding signals transmitted to the UE in operation of the uplink mobility procedure.

In accordance with embodiments of the disclosure, a method for providing uplink based mobility operation of user equipment (UE) operable in a wireless network is provided. The method of embodiments includes transmitting, by the UE, a physical uplink measurement indication channel (PUMICH) signal or physical uplink measurement reference signal (PUMRS) in a uplink mobility procedure implemented in the wireless network with respect to the UE. The method of embodiments further includes receiving, by the UE, an uplink mobility reference signal acknowledgment transmitted by an access node of the wireless network in operation of the uplink mobility procedure using an alternative physical channel to a physical keep alive channel (PKACH), wherein the uplink mobility reference signal acknowledgment comprises an acknowledgment to the PUMICH signal or PUMRS transmitted by the UE.

In accordance with further embodiments of the disclosure, an apparatus for providing uplink based mobility operation of user equipment (UE) operable in a wireless network is provided. The apparatus includes at least one processor, and a memory coupled to the processor. The at least one processor of embodiments is configured to transmit a physical uplink measurement indication channel (PUMICH) signal or physical uplink measurement reference signal (PUMRS) in a uplink mobility procedure implemented in the wireless network with respect to the UE. The at least one processor of embodiments is further configured to receive an uplink mobility reference signal acknowledgment transmitted by an access node of the wireless network in operation of the uplink mobility procedure using an alternative physical channel to a physical keep alive channel (PKACH), wherein the uplink mobility reference signal acknowledgment comprises an acknowledgment to the transmitted PUMICH signal or PUMRS.

In accordance with still further embodiments of the disclosure, a non-transitory computer-readable medium having program code recorded thereon for providing uplink based mobility operation of user equipment (UE) operable in a wireless network is provided. The program code of embodiments includes code to transmit a physical uplink measurement indication channel (PUMICH) signal or physical uplink measurement reference signal (PUMRS) in a uplink mobility procedure implemented in the wireless network with respect to the UE. The program code of embodiments further includes code to receive an uplink mobility reference signal acknowledgment transmitted by an access node of the wireless network in operation of the uplink mobility procedure using an alternative physical channel to a physical keep alive channel (PKACH), wherein the uplink mobility reference signal acknowledgment comprises an acknowledgment to the transmitted PUMICH signal or PUMRS.

In accordance with still further embodiments of the disclosure, an apparatus for providing uplink based mobility operation of user equipment (UE) operable in a wireless network is provided. The apparatus of embodiments includes means for transmitting, by the UE, a physical uplink measurement indication channel (PUMICH) signal or physical uplink measurement reference signal (PUMRS) in a uplink mobility procedure implemented in the wireless network with respect to the UE. The apparatus of embodiments further includes means for receiving, by the UE, an uplink mobility reference signal acknowledgment transmitted by an access node of the wireless network in operation of the uplink mobility procedure using an alternative physical channel to a physical keep alive channel (PKACH), wherein the uplink mobility reference signal acknowledgment comprises an acknowledgment to the PUMICH signal or PUMRS transmitted by the UE.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 7A, 7B, 8A, and 8B show communication flows for an uplink based mobility process utilizing a virtual KACH according to some embodiments of the present disclosure.

DETAILED DESCRIPTION

Figure 1:
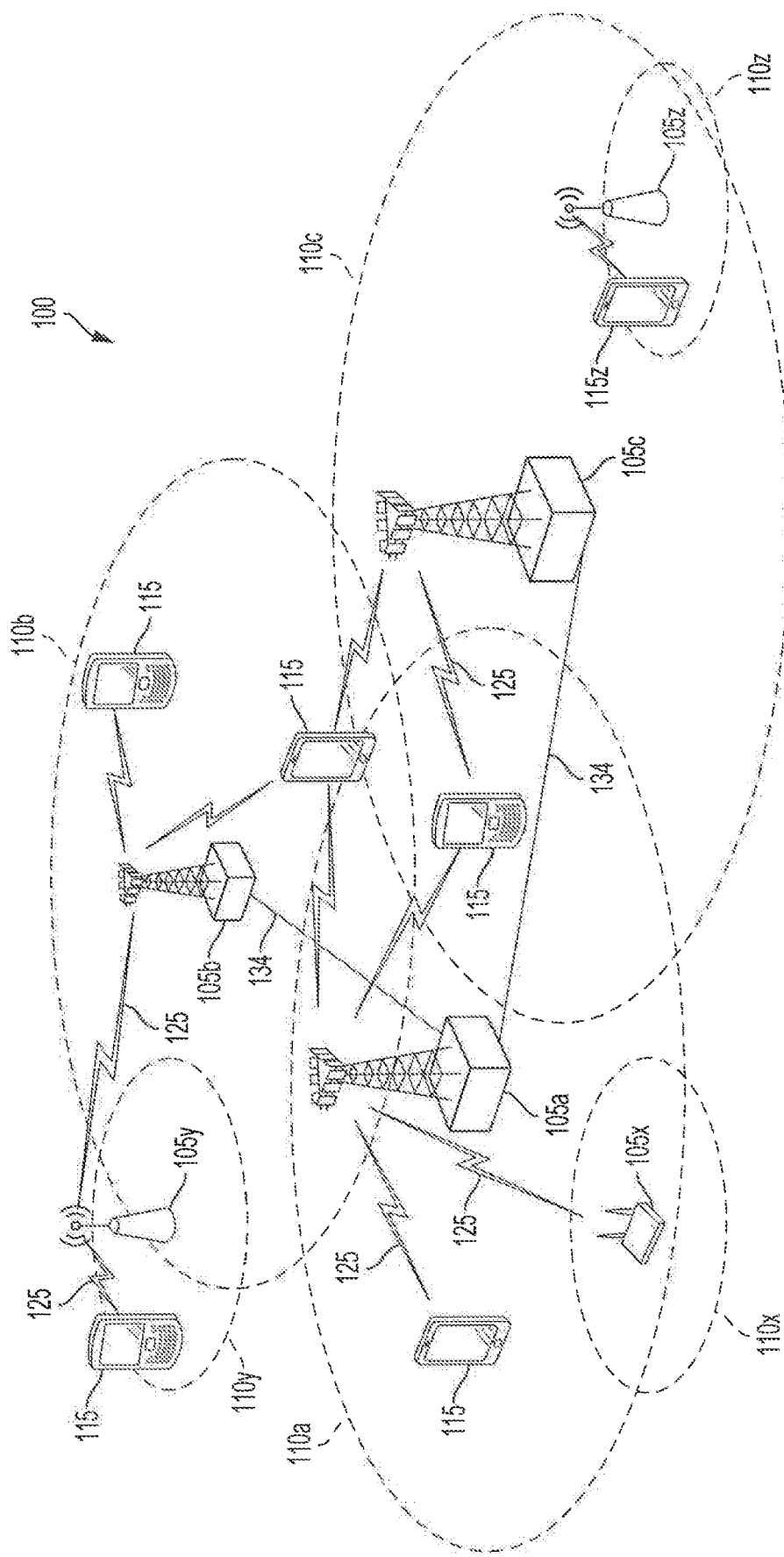
FIG. 1 is a block diagram illustrating details of a wireless communication system in which embodiments of the present disclosure may be deployed.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style network arrangements (e.g., device to device or peer to peer or ad hoc network arrangements, etc.).

Turning back to FIG. 1 wireless network 100 includes a number of base stations, such as may comprise evolved node Bs (eNBs) or G node Bs (gNBs). These may be referred to herein as eNBs 105. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used. In implementations of wireless network 100 herein, eNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, eNBs 105a, 105b and 105c are macro eNBs for the macro cells 110a, 110b and 110c, respectively. eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Although backhaul communication 134 is illustrated as wired backhaul communications that may occur between eNBs, it should be appreciated that backhaul communications may additionally or alternatively be provided by wireless communications.

Figure 2:
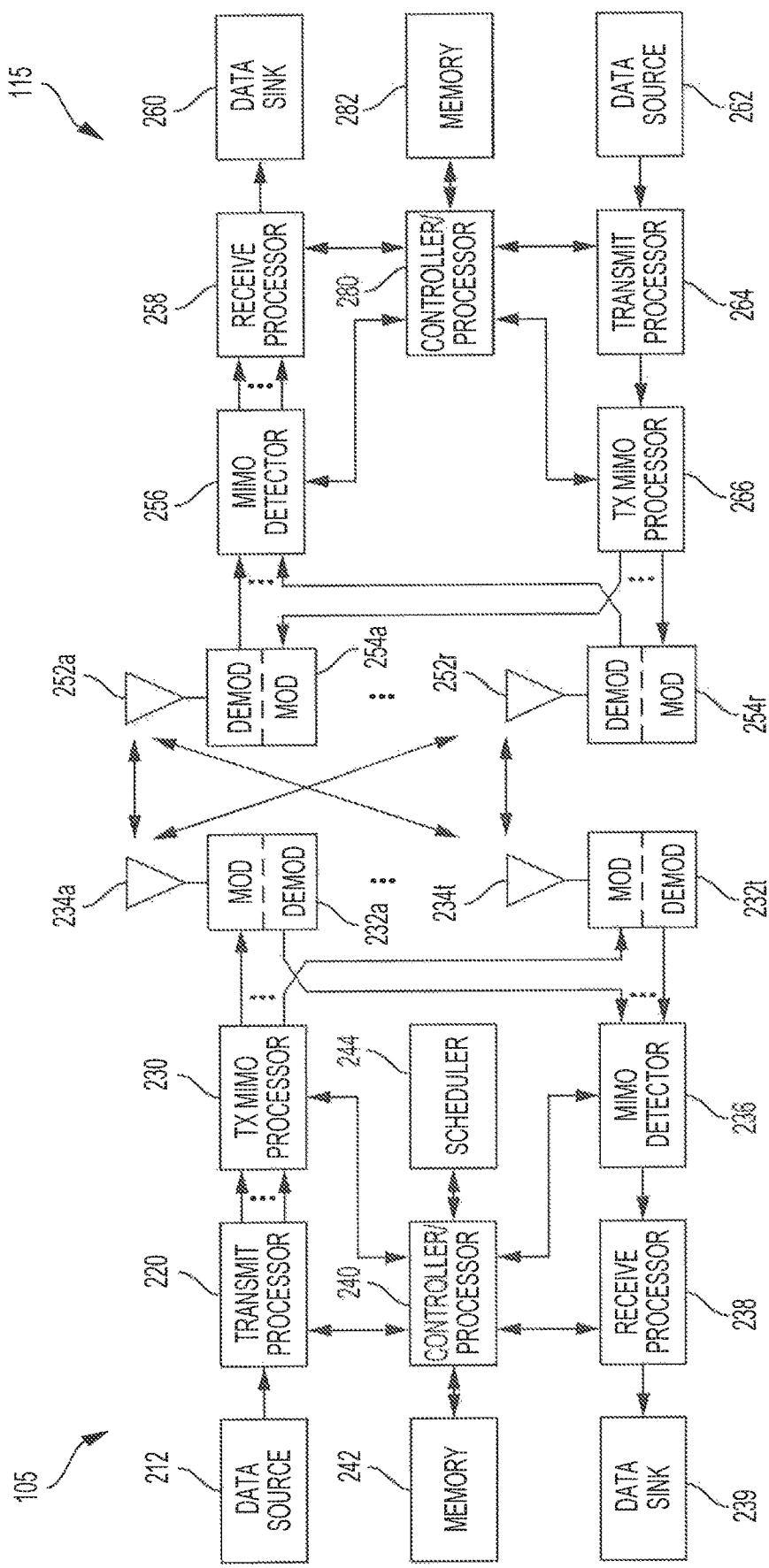
FIG. 2 is a block diagram conceptually illustrating a design of an access node and a UE configured according to some embodiments of the present disclosure.

FIG. 2 shows a block diagram of a design of base station/eNB 105 and UE 115. These can be one of the base stations/eNBs and one of the UEs in FIG. 1. For a restricted association scenario (as mentioned above), the eNB 105 may be small cell eNB 105z in FIG. 1, and UE 115 may be UE 115z, which in order to access small cell eNB 105z, would be included in a list of accessible UEs for small cell eNB 105z. eNB 105 may also be a base station of some other type. eNB 105 may be equipped with antennas 234a through 234t, and UE 115 may be equipped with antennas 252a through 252r.

At eNB 105, transmit processor 220 may receive data from data source 212 and control information from controller/processor 240. The control information may be for the PBCH, PCFICH, PHICH, PDCCH, etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the PSS, SSS, and cell-specific reference signal. Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from eNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to eNB 105. At eNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at eNB 105 and UE 115, respectively. Controller/processor 240 and/or other processors and modules at eNB 105 may perform or direct the execution of various processes for the techniques described herein. Controllers/processor 280 and/or other processors and modules at UE 115 may also perform or direct the execution illustrated in FIGS. 3, 4A, 4B, 6, 7A, 7B, 8A, and 8B, and/or other processes for the techniques described herein. Memories 242 and 282 may store data and program codes for eNB 105 and UE 115, respectively. Scheduler 244 may schedule UEs for data transmission on the downlink and/or uplink.

Figure 3:
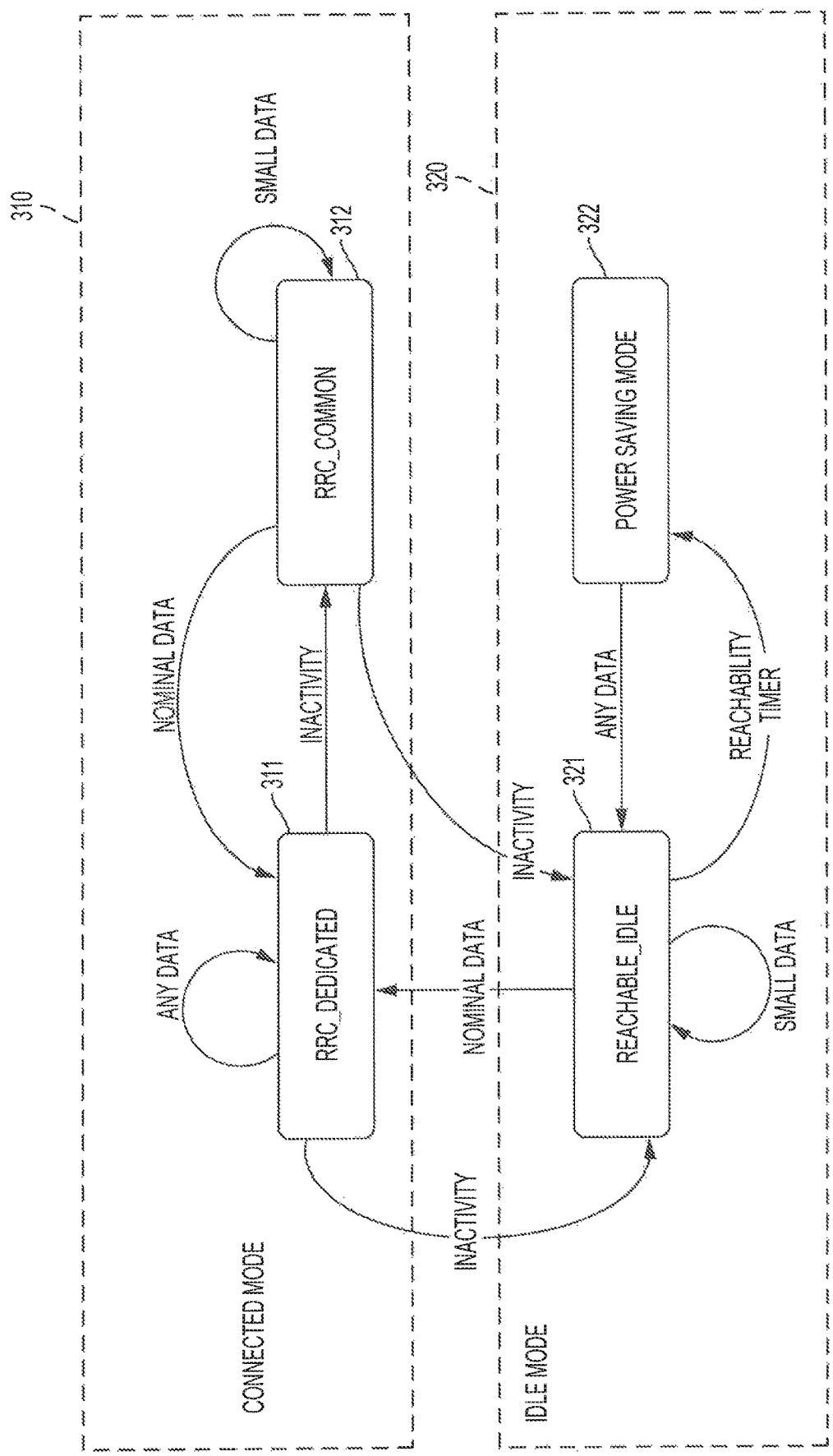
FIG. 3 shows various radio resource control (RRC) states for a UE operable in a wireless communication network according to some embodiments of the present disclosure.

FIG. 3 shows various radio resource control (RRC) states for a UE operable in a wireless communication network to aid in understanding operation of uplink based mobility procedures herein. In particular, the UE RRC states shown in FIG. 3 include connected mode states 310 wherein a connection is maintained between the UE and the network (e.g., a UE context is maintained in the RAN) and idle mode states 320 wherein the UE is able to establish a connection with the network (e.g., no UE context is maintained in the RAN).

Connected mode states 310 of FIG. 3 include RRC_Dedicated state 311 and RRC_Common state 312. In RRC_Dedicated state 311 the UE is connected to the network and actively communicating data, and thus in addition to a UE context being maintained in the RAN, the UE is assigned air interface resources and may transmit and receive any data. In RRC_Common state 312 the UE is connected to the network although not actively communicating data, and thus although a UE context is maintained in the RAN to readily facilitate active data communication, air interface resources are not assigned to the UE and the UE may transmit and receive only small amounts of data.

Idle mode states 320 of FIG. 3 include Reachable_Idle state 321 and Power Saving Mode 322. In Reachable_Idle state 321 the UE is operable to receive possible incoming connections and to establish an RRC connection for data communication, and thus in addition to no UE context being maintained in the RAN, air interface resources are not assigned to the UE although the UE may transmit and receive small amounts of data. In Power Saving Mode 322 the UE is in a low power or sleep mode, and thus no UE context is maintained in the RAN, no air interface resources are assigned to the UE, and no data transmission or reception is provided.

It should be appreciated that the foregoing UE states may be referred to using names and nomenclatures different than those used above and shown in FIG. 3. For example, a UE RRC state corresponding to the above described RRC_Dedicated state may be referred to as a RRC_Connected active state, a RRC_Active state, a RRC_Connected_Active state, etc. Likewise, a UE RRC state corresponding to the above described RRC_Common state may be referred to as a RRC_Connected inactive state, a RRC_Inactive state, a RRC_Connected_Inactive state, a RRC_Dormant state, etc.

Irrespective of a particular one of the mode states a UE may be operating in, the UE may experience mobility within the wireless communication network (i.e., move between physical locations within the service area of the wireless communication network). Accordingly, embodiments of the present disclosure implement uplink mobility procedures in accordance with the concepts herein to facilitate maintaining the ability to support communication services between the mobile UE and the wireless communication network as the UE moves within the coverage area of the wireless communication network (e.g., enabling handover of the UE between access nodes, establishing a connection between the mobile UE and an access node selected to serve the UE, etc.). The uplink mobility procedures of embodiments of the present disclosure operate to provide flexible power consumption for the UEs, better and timely channel information, improved networking connections, and/or better mobility tracking. Additional benefits realized through uplink mobility procedures implemented in accordance with the concepts herein include network side positives such as better, reduced network resource use (freeing up those resources for other items) and lower handover failure rates.

Implementations of uplink based mobility procedures generally utilize a plurality of physical channels to support the uplink based mobility and procedures (e.g., random access, paging, and on-demand system information (SI)). In particular, uplink based mobility procedures typically require a physical keep alive channel (PKACH) and physical cell identification channel (PCICH). For example, in facilitating uplink based mobility according to a typical uplink based mobility procedure, the UE transmits an uplink mobility reference signal (e.g., a physical uplink measurement indication channel (PUMICH) (e.g., when operating in a RRC_Common state) or physical uplink measurement reference signal (PUMRS) (e.g., when operating in a RRC_Dedicated state) for mobility tracking at the network access nodes. An access node (e.g., an access node having the best reception of the reference signal from the UE or otherwise selected to serve the UE) transmits a PKACH signal for acknowledging the uplink mobility reference signal and signaling paging indicator to the UE. This uplink based mobility process requiring a PKACH channel for facilitating uplink based mobility (e.g., when the UE is operating in a RRC_Dedicated state or a RRC_Common state) is illustrated in the communication flow of FIG. 4A. The PKACH channel might not, however, be required in RRC_Dedicated state when backward handover is applied.

Figure 4A:
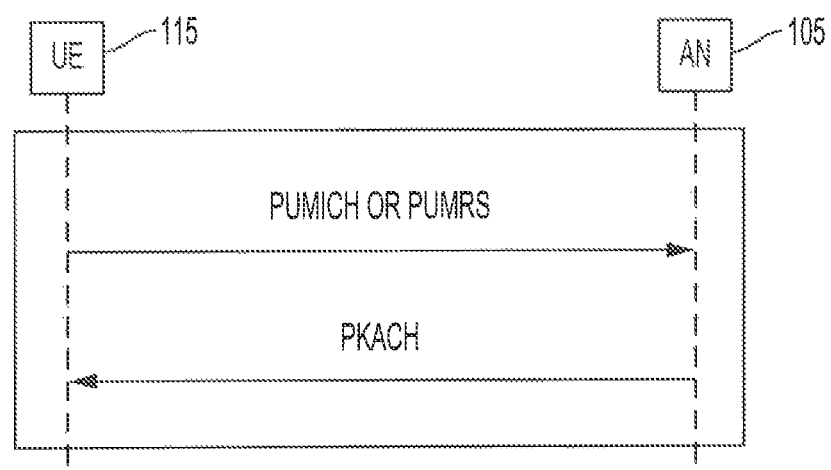
FIGS. 4A and 4B show communication flows for uplink based mobility.
Figure 4B:
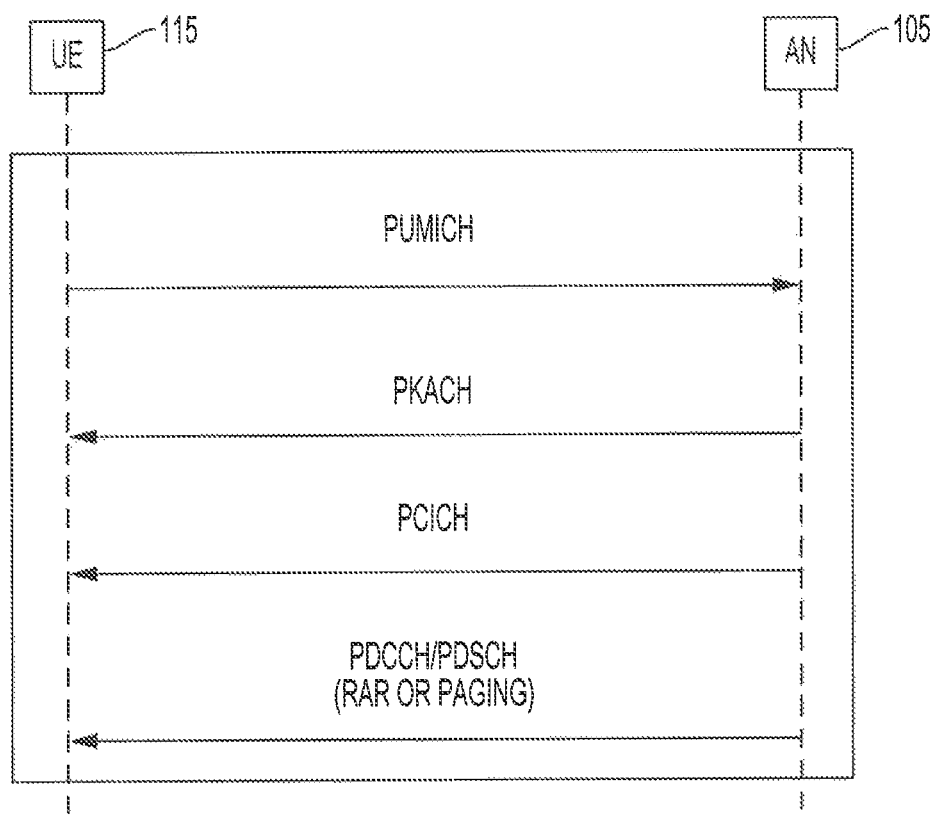

FIG. 4B shows a communication flow of a random access procedure for uplink based mobility with respect to a random access procedure or paging decoding when the UE is paged (e.g., when the UE is operating in a RRC_Common state) in accordance with a typical uplink based mobility process. In the example of FIG. 4B, the UE transmits an uplink mobility reference signal (e.g., PUMICH) for mobility tracking at the network access nodes or for random access request. As with the example of FIG. 4A, an access node (e.g., an access node having the best reception of the reference signal from the UE or otherwise selected to serve the UE) transmits a PKACH signal for acknowledging the uplink mobility reference signal and signaling paging indicator to the UE. In the example of FIG. 4B, however, the UE may be initiating data transfer (e.g., random access procedure to establish an active data communication connection) or the access node may be initiating data transfer (e.g., paging procedure to establish an active data communication connection). Accordingly, the access node provides a random access response (RAR) or paging signal via a physical downlink control channel (PDCCH) physical downlink shared channel (PDSCH). In uplink based mobility, the UE is typically only required to perform zone search and measurement. Accordingly, only zone identification information may be available to the UE, and cell identification information (e.g., physical cell identification (PCI)) is generally delivered to the UE when needed. For example, in downlink-based mobility, the UE may be required to frequently perform neighbor cell search (e.g., detecting PCI and timing) and measurement, and to report such measurement to an access node. When operating in a power saving mode, the UE may not be required to perform neighbor cell search and measurement, and thus the UE would not know PCI, which is required to decode either paging message or random access response. Accordingly, PCI is typically provided in one or more physical channels (e.g., cell-specific sync signals or PCICH) for delivery of PCI to the UE when needed. The UE utilizes the PCI information provided via the PCICH for the access node in order to decode the RAR or paging signal. Accordingly, the uplink based mobility process of FIG. 4B requires PKACH and PCICH channels, in addition to PDCCH and/or PDSCH channels, and requires PCI for the particular access node providing the RAR or paging signal for facilitating uplink based mobility.

In contrast to the above described uplink based mobility procedures, embodiments implemented in accordance with concepts herein provide uplink based mobility procedures that do not utilize one or more of the physical channels typically required to support uplink based mobility and/or utilize uplink-based (UL-based) mobility specific identification (ID) (i.e., an abstracted or virtualized communication resource that, although utilized in coding and decoding data communications of one or more network access nodes, is decoupled from the network access nodes in that it is not a physical cell identifier for an access node and does not provide information identifying an access node or otherwise being unique to an access node, but nevertheless provides information in accordance with concepts herein that is utilized in one or more functions, such as coding and/or decoding data, for which information identifying an access node is generally used) for decoding signals in an uplink mobility process. For example, to further use of and enhance uplink based mobility, physical layer designs are provided that do not utilize PKACH and/or PCICH channels for uplink mobility (e.g., using an alternative physical channel to the PKACH to receive uplink mobility reference signal acknowledgments and/or avoiding the use of a PCICH to provide PCI for uplink based mobility operation through the use of UL-based mobility specific ID information), such as to provide more efficient implementations of uplink based mobility, according to embodiments herein. Accordingly, various devices (e.g., one or more of access nodes 105 and/or UEs 115) of wireless network 100 are adapted according to concepts herein to enable uplink based mobility facilitating movement of wireless communication devices (e.g., UEs 115) within the wireless network while maintaining communication services.

In providing for uplink based mobility according to embodiments, a number of zones may be defined within wireless network 100. Such zones each comprise a collection of synchronized (e.g., time synchronized for control and signal transmission) cells or transmission reception points (TRPs) (e.g., comprising a plurality of TRPs associated with an access node and/or a plurality of access nodes, all of which being synchronized). For example, access nodes 105 of wireless network 100 may be operated in a plurality of groupings to provide a number of zones, such as zones 501, 502, and 503 illustrated in FIG. 5. It should be appreciated that each of zones 501, 502, and 503 of the illustrated embodiment comprise a plurality of tightly synchronized cells, as may be provided by any number of access nodes 105 and TRPs, although a single access node is shown for simplicity. Likewise, although any number of wireless communication devices may be provided uplink based mobility according to embodiments herein, a single UE is shown in FIG. 5 for simplicity.

Figure 5:
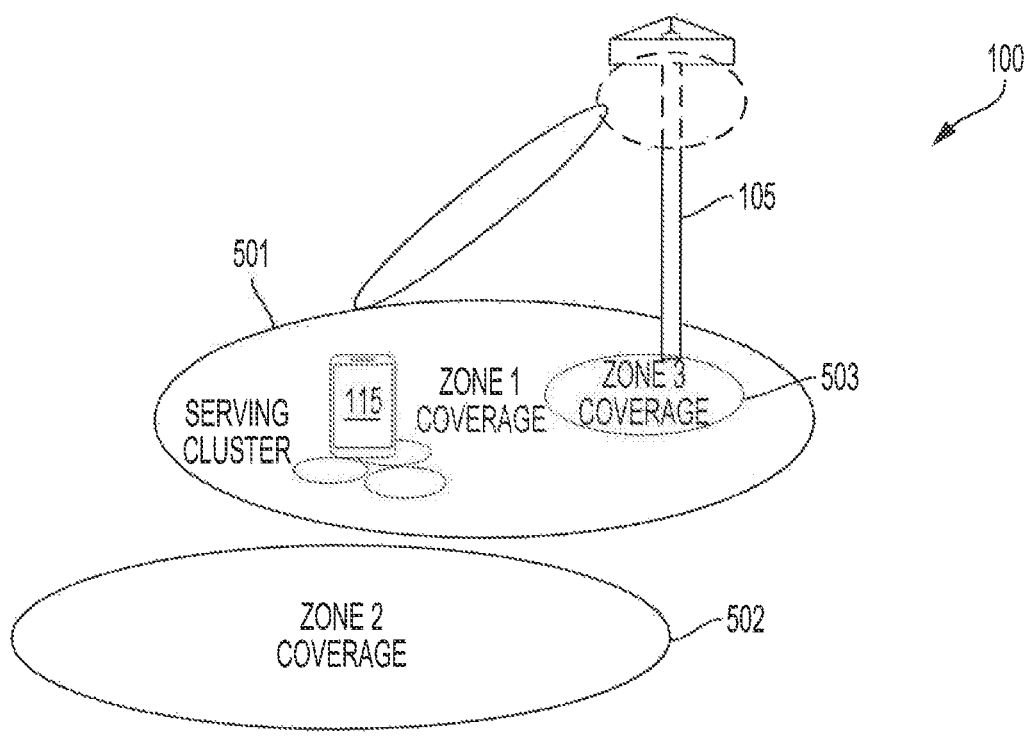
FIG. 5 shows access nodes of a wireless network operated in a plurality of groupings to provide a number of zones according to some embodiments of the present disclosure.

In operation of uplink based mobility procedures in a wireless network providing a zone coverage configuration, such as illustrated in FIG. 5, intra-zone mobility (e.g., wireless device mobility between cells of a particular zone) may be transparent to the UE. However, for inter-zone mobility (e.g., wireless device mobility between cells of different zones) the UE may perform inter-zone handover processing, such as when a certain set of conditions are satisfied.

According to some embodiments, network devices (e.g., access nodes 105 and UEs 115) utilize UL-based mobility specific ID for implementing uplink based mobility, such as for scrambling, coding, descrambling, and decoding PDCCH and/or PDSCH with respect to random access and/or paging operations, and thus avoid the use of PCICH for obtaining PCI. A UL-based mobility specific ID may, for example, be provided to a UE (e.g., provided to UE 115 by access node 105 as part of an uplink mobility process) for use by the UE in decoding downlink information in an uplink mobility procedure of embodiments. In operation according to embodiments, when a UE is configured for uplink based mobility, a UL-based mobility specific ID can be assigned to a UE. Accordingly, instead of signaling PCI in one or more physical channels (e.g., cell-specific sync signals or PCICH), one or more network access node can provide a UE with an UL-based mobility specific ID as part of the uplink based mobility configuration process (e.g., a UL-based mobility specific ID may be configured initially for a UE in an uplink based mobility setup stage, such as in a mobility configuration message when the UE transits from downlink based mobility to uplink based mobility), and thereafter one or more access node may signal an updated UL-based mobility specific ID (e.g., when a UE is in UL-based mobility, a network access node may update the UL-based mobility specific ID in a handover command when the UE is moved from one zone to another zone) if needed. UL-based mobility specific ID of embodiments is provided as a part of the uplink based mobility procedure only, and is not utilized for other functions such as coordinated multipoint (CoMP) operation.

UL-based mobility specific ID utilized in some implementations comprise a value associated with the UE utilized by the network in coding various information (e.g., RAR, paging, etc.) transmitted to the UE (e.g., by one or more access node of the wireless communication system). For example, control logic in the network (e.g., logic of controller/processor 240) may generate a pool of numbers for use as UL-based mobility specific IDs of embodiments, and a number or one UL-based mobility specific ID from this pool may be assigned to a UE such that assignments have very low collision across multiple UEs in a geographical region/zone. It should be appreciated that a UL-based mobility specific ID may not necessarily unique to a UE. For example, UEs in different zones may share the same UL-based mobility specific ID and, within a zone, multiple UEs may share same UL-based mobility specific ID if they are sufficiently separated geographically (i.e., positioned in the zone to avoid collisions between the UEs). Operation according to embodiments provides for updating one or more UL-based mobility specific ID to dynamically reconfigure a new UL-based mobility specific ID to a UE when the UE is in uplink based mobility and the mobility may result in collision across multiple UEs.

In operation of an uplink mobility procedure of embodiments, a UL-based mobility specific ID does not provide information identifying or otherwise unique to an access node (i.e., UL-based mobility specific ID is not physical cell identification), but rather is unique within a zone (e.g., common to the access nodes of the zone), and may be different from zone to zone. Accordingly, a UL-based mobility specific ID of embodiments may be utilized with respect to a plurality of cells in the wireless network (e.g., wireless network 100). For example, a UL-based mobility specific ID of embodiments may be utilized with respect to all cells in the wireless network. Alternatively, a UL-based mobility specific ID of some embodiments may be utilized with respect to a subset of cells in the wireless network (e.g., the grouping of access nodes/TRPs of a particular zone in which the UE is operating within).

In operation according to some embodiments, a UE may additionally or alternatively detect a PCI used in an uplink mobility procedure from cell specific synchronization signals (e.g., PSS and/or SSS) transmitted by access nodes/TRPs of a zone in which the UE is operating. In uplink based mobility, both cell specific synchronization signals and zone specific synchronization signals may be simultaneously broadcast. However, when a UE is in uplink based mobility, the UE may operate to search and measure the zone specific synchronization signals only. In operation according to some embodiments, the UE may additionally search the cell specific signals for detecting PCI when needed.

A UL-based mobility specific ID provided according to embodiments herein may be used by components of the wireless communication system for control purposes. For example, a UL-based mobility specific ID can be used by a UE to decode control and/or data information (e.g., channels such as PDCCH and PDSCH providing RAR or paging data) provided with respect to any cell of the wireless network, some subset of cells of the wireless network (e.g., any of one or more access nodes associated with the zone in which the UE is operating), etc. Accordingly, embodiments of an uplink based mobility process utilizing a UL-based mobility specific ID herein may operate without utilizing a PCICH for providing an access node PCI, as shown in FIG. 6.

Figure 6:
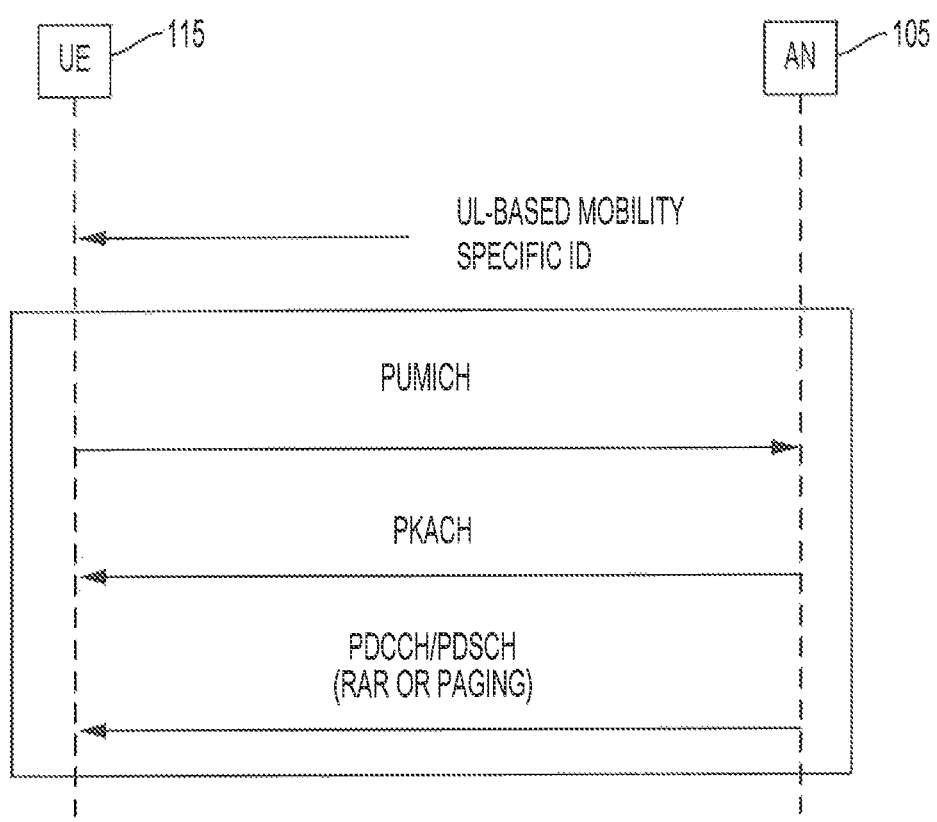
FIG. 6 shows a communication flow for an uplink based mobility process utilizing a UL-based mobility specific ID according to some embodiments of the present disclosure.

In particular, FIG. 6 shows a communication flow of a random access procedure for facilitating uplink based mobility with respect to a random access procedure or paging decoding when the UE is paged (e.g., when the UE is operating in a RRC_Common state) in accordance with an embodiment utilizing UL-based mobility specific ID signaling. It should be appreciated that access node 105 operable in accordance with uplink based mobility procedures utilizing UL-based mobility specific ID may be provided in a distributed implementation (e.g., wherein one or more TRPs are distributed within a coverage area of the access node and are coupled to one or more access node controllers (ANCs) providing control operations with respect to the access node) or a non-distributed implementation (e.g., wherein the various transmission reception and control devices of the access node are co-located). In a distributed implementation, various signaling may be provided between a TRP in wireless communication with the UE and an ANC that is not specifically shown in the communication flow of FIG. 6.

In the example illustrated in FIG. 6, the UL-based mobility specific ID may be assigned to the UE when the UE is configured for uplink based mobility (e.g., a UL-based mobility specific ID may be received by UE 115, using antennas 252a through 252r, DEMODs 254a through 254r, MIMO detector 256, and receive processor 258 under control of logic of controller/processor 280, via a wireless link from an access node initially registering the UE to the wireless network, from an access node providing services to the UE when uplink based mobility is initiated with respect to the UE, etc., and the UL-based mobility specific ID may be stored in memory 282 of the UE for use in uplink mobility processing). Additionally or alternatively, PCI carried in one or more cell specific synchronization signals (e.g., PSS, SSS, etc. transmitted by one or more access nodes 105) may be detected by the UE (e.g., UE 115, using antennas 252a through 252r, DEMODs 254a through 254r, MIMO detector 256, and/or receive processor 258 under control of logic of controller/processor 280, detecting PCI carried in PSS and/or SSS, and the PCI may be stored in memory 282), such as when the UE is performing network mobility operation.

In operation according to the illustrated embodiment of FIG. 6, the UE transmits an uplink mobility reference signal (e.g., UE 115 transmits PUMICH using transmit processor 264, TX MIMO processor 266, modulators 254a through 254r, and/or antennas 252a through 252r under control of controller/processor 280) for mobility tracking at the network access nodes or for random access request. In response, an access node (e.g., an access node having the best reception of the reference signal from the UE or otherwise selected to serve the UE) transmits a PKACH signal (e.g., access node 105 using transmit processor 220, TX MIMO processor 230, MODs 232a through 232t, and/or antennas 234a through 234t under control of controller/processor 240) for acknowledging the uplink mobility reference signal and signaling paging indicator to the UE. The access node of the illustrated embodiment also provides a RAR or paging signal via a physical downlink control channel (PDCCH) physical downlink shared channel (PDSCH) (e.g., access node 105 using transmit processor 220, TX MIMO processor 230, MODs 232a through 232t, and/or antennas 234a through 234t under control of controller/processor 240).

In the example of FIG. 6 the UE is not provided PCI via a PCICH. Instead, the UE of embodiments utilizes the UL-based mobility specific ID provided as part of the uplink mobility procedure to decode the RAR or paging messages (e.g., logic of controller/processor 280 of UE 115 uses UL-based mobility specific ID, as may have been stored in memory 282, to decode RAR or paging messages of a random access or paging procedure) to establish an active data communication connection. Alternatively, the UE of some embodiments utilizes PCI detected from cell specific synchronization signals (e.g., logic of controller/processor 280 of UE 115 uses PCI detected from PSS, SSS, etc., as may have been stored in memory 282, to decode RAR or paging messages of a random access or paging procedure, as opposed to using PCI transmitted via PCICH), to establish an active data communication connection.

According to some embodiments, network devices (e.g., access nodes 105 and UEs 115) communicate PUMICH acknowledgments and paging indications in one or more alternative physical channels (e.g., physical channels that are provided for communication of other data and/or control signaling, in the alternative to a PKACH). For example, PUMICH acknowledgments and paging indications are transmitted (e.g., by access node 105 using transmit processor 220, TX MIMO processor 230, MODs 232a through 232t, and/or antennas 234a through 234t under control of controller/processor 240) using a physical slot format indication channel (PSFICH) and/or a physical downlink control channel (PDCCH), instead of PKACH, to support uplink based mobility according to embodiments herein. That is, in accordance with embodiments of the disclosure, a PSFICH and/or PDCCH may be utilized as an alternative physical channel to a PKACH for communicating an uplink mobility reference signal acknowledgment, such as an uplink mobility reference signal comprising an acknowledgment to a PUMICH signal or a PUMRS transmitted by the UE. In implementations according to embodiments, a PSFICH or PDCCH configured to carry the aforementioned acknowledgments and/or other data utilized for facilitating uplink based mobility may have a dedicated search space for these responses.

PSFICH or PDCCH of embodiments may, in addition to carrying PUMICH or PUMRS acknowledgement information may additionally carry other data utilized for facilitating uplink mobility. For example, PSFICH or PDCCH of embodiments may include information indicating whether the UE is being paged (e.g., a page indicator). Accordingly, the UE may receive (e.g., UE 115 using antennas 252a through 252r, DEMODs 254a through 254r, MIMO detector 256, and/or receive processor 258 under control of logic of controller/processor 280) and utilize this information to know that decoding of a paging signal and/or other information is to be performed (e.g., logic of controller/processor 280 of UE 115 may decode a PDCCH and/or PDSCH when the paging indicator in PSFICH signals that the paging information comes up for the UE). If the UE is paged (e.g., if the access node has downlink data for the UE), the UE may decode PDCCH/PDSCH using a paging radio network temporary identity (P-RNTI) or the UL-based mobility specific ID of embodiments, for example.

Figures 8A, 8B:
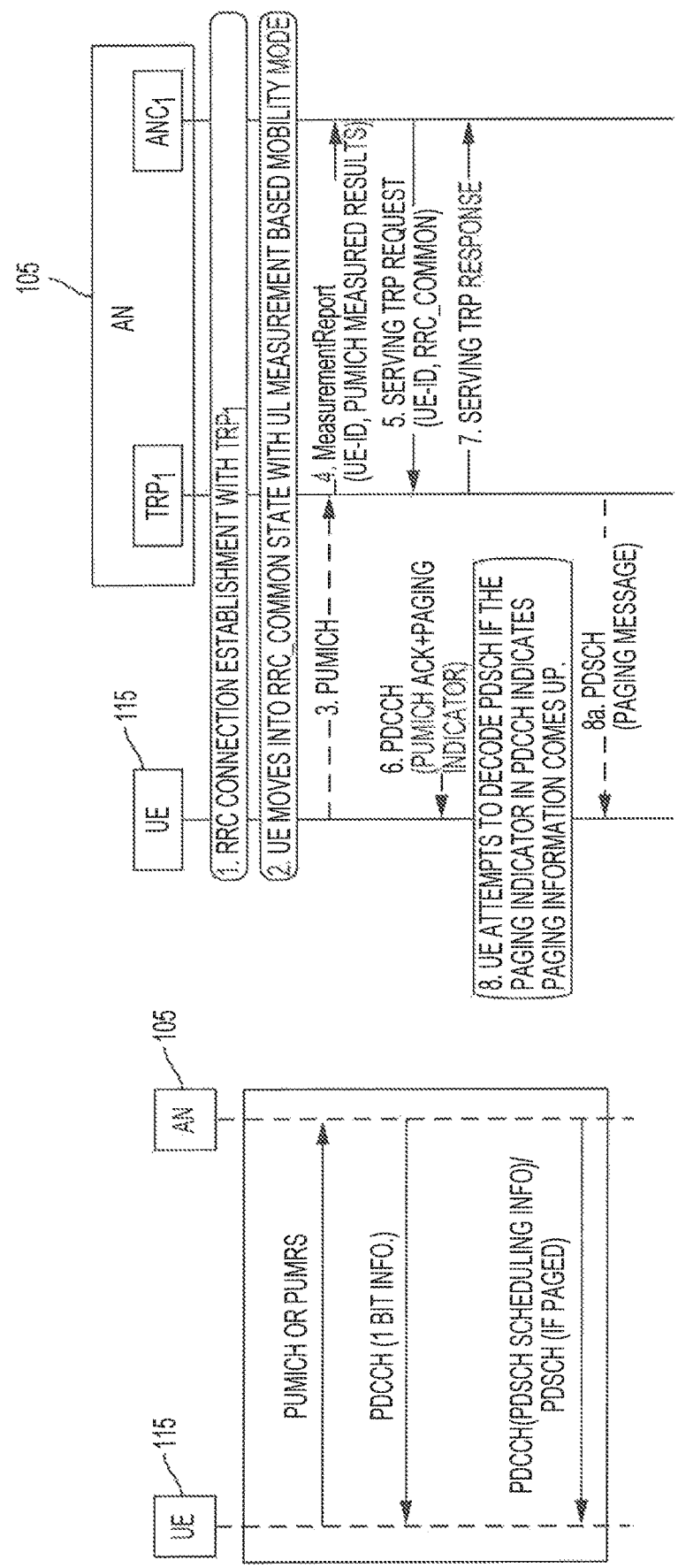

FIGS. 7A, 7B, 8A, and 8B show communication flows of operation of an uplink based mobility procedure utilizing PSFICH or PDCCH according to embodiments herein. It should be appreciated that access node 105 operable in accordance with uplink based mobility procedures utilizing PSFICH or PDCCH may be provided in a distributed implementation (e.g., wherein one or more TRPs are distributed within a coverage area of the access node and are coupled to one or more ANCs providing control operations with respect to the access node) or a non-distributed implementation (e.g., wherein the various transmission reception and control devices of the access node are co-located). For example, access nodes 105 shown in the communication flows of FIGS. 7B and 8B are illustrated as being in a distributed implementation, wherein the access node comprises one or more TRPs (including $TRP_1$), distributed within a coverage area of the access node, coupled to one or more ANCs (including $ANC_1$), providing control operations with respect to the access node.

The communication flow of FIG. 7A shows operation of an uplink based mobility procedure utilizing PSFICH configured to carry PUMICH or PUMRS ACKs and paging indicators, without the use of a PKACH, according to embodiments. FIG. 7B shows further detail with respect to an embodiment of the communication flow of FIG. 7A.

In operation according to the embodiment illustrated in FIG. 7B, the UE establishes a RRC connection with an access node of the wireless network (e.g., via $TRP_1$ of the access node). Thereafter in the illustrated communication flow, the UE as may have been configured with uplink based mobility mode parameters (e.g., provided a control signal to implement uplink based mobility, provided a UL-based mobility specific ID, etc.) moves into the RRC_Common state. The UE of the illustrated example transmits PUMICH to the access node while operating in the RRC_Common state. In response, $TRP_1$ (e.g., one or more of the TRPs receiving the PUMICH from the UE) of the access node reports the measured result of the PUMICH to $ANC_1$ (e.g., one or more of the ANCs controlling the TRP) of the access node in the illustrated communication flow. In operation according to embodiments, $ANC_1$ may issue a request that $TRP_1$ serve the UE (e.g., where $TRP_1$ provides a best measured result of the PUMICH of the TRPs of the access node and/or zone). $TRP_1$ of the illustrated embodiment transmits the PSFICH (e.g., in a dedicated search space of the PSFICH) to acknowledge the PUMICH reception and signals the paging indicator, if the UE is being paged. For example, a paging signal for the UE may be transmitted in the PDCCH. In operation according to embodiments, $TRP_1$ may acknowledge the serving TRP request issued by $ANC_1$. The UE of the illustrated communication flow decodes PDCCH and/or PDSCH when the paging indicator in the PSFICH signals that the paging information comes up for the UE. It should be appreciated that the UE may decode the PDCCH and/or PDSCH (e.g., to obtain the paging information) using a UL-based mobility specific ID, P-RNTI, PCI, etc. depending upon the particular embodiment of an uplink mobility procedure implemented.

The communication flow of FIG. 8A shows operation of an uplink based mobility procedure utilizing PDCCH configured to carry PUMICH or PUMRS ACKs and paging indicators, without the use of a PKACH, according to embodiments. FIG. 8B shows further detail with respect to an embodiment of the communication flow of FIG. 8A.

In operation according to the embodiment illustrated in FIG. 8B, the UE establishes a RRC connection with an access node of the wireless network (e.g., via $TRP_1$ of the access node). Thereafter in the illustrated communication flow, the UE as may have been configured with uplink based mobility mode parameters (e.g., provided a control signal to implement uplink based mobility, provided a UL-based mobility specific ID, etc.) moves into the RRC_Common state. The UE of the illustrated example transmits PUMICH to the access node while operating in the RRC_Common state. In response, $TRP_1$ (e.g., one or more of the TRPs receiving the PUMICH from the UE) of the access node reports the measured result of the PUMICH to $ANC_1$ (e.g., one or more of the ANCs controlling the TRP) of the access node in the illustrated communication flow. In operation according to embodiments, $ANC_1$ may issue a request that $TRP_1$ serve the UE (e.g., where $TRP_1$ provides a best measured result of the PUMICH of the TRPs of the access node and/or zone). $TRP_1$ of the illustrated embodiment transmits a virtual KACH for the UE in the PDCCH (e.g., in a dedicated search space of the PDCCH) to acknowledge the PUMICH reception and signals the paging indicator, if the UE is being paged. For example, the UE may decode the PDCCH using a UL-based mobility specific ID, P-RNTI, PCI, etc. to obtain the acknowledgment and paging indicator. In operation according to embodiments, $TRP_1$ may acknowledge the serving TRP request issued by $ANC_1$. The UE of the illustrated communication flow decodes the PDSCH when the paging indicator in the PDCCH signals that the paging information comes up for the UE. It should be appreciated that the UE may decode the PDSCH (e.g., to obtain the paging information) using a UL-based mobility specific ID, P-RNTI, PCI, etc. depending upon the particular embodiment of an uplink mobility procedure implemented.

Although the exemplary communication flows of FIGS. 7B and 8B provide for the ANC issuing a request that the TRP serve the UE and the TRP providing a response to this request, embodiments may omit such control signaling operation. For example, where the TRP detects a measured result of the PUMICH exceeding a threshold, or the TRP otherwise autonomously determines that the TRP should serve the UE, the TRP may proceed to serve the UE without a request to do so from the ANC.

Figure 9:
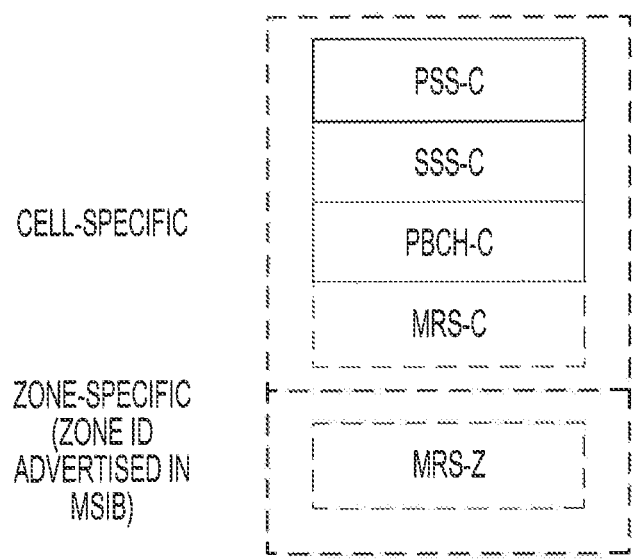
FIG. 9 shows signals from which PCI may be obtained by a UE according to some embodiments of the present disclosure.

Embodiments have been described above as utilizing a UL-based mobility specific ID, P-RNTI, PCI, etc. to decode PDCCH and/or PDSCH. In particular, embodiments have been described as utilizing a UL-based mobility specific ID to facilitate uplink based mobility avoiding the use of PCICH for obtaining PCI for use in an uplink mobility procedure. Alternative embodiments may operate to detect PCI from cell-specific synchronization signals to facilitate uplink based mobility avoiding the use of PCICH for obtaining PCI for use in an uplink mobility procedure. For example, as shown in FIG. 9, rather than obtaining PCI for a cell via PCICH, a UE of embodiments may obtain PCI, such as for use in decoding PDCCH/PDSCH coded using the cell identification, from PSS and/or SSS transmitted by an access node of the cell. It should be appreciated that such embodiments facilitate uplink based mobility and avoiding the use of PCICH for obtaining PCI.

Embodiments of the present disclosure can be incorporated into various components of a communication system. For example, some embodiments can be implemented in network-based components (e.g., network control or communication devices), user-equipment components (e.g., mobile devices), or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 1, 2, 4A, 4B, 5, 6, 7A, 7B, 8A, and 8B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for providing uplink based mobility operation of user equipment (UE) operable in a wireless network, the method comprising:

obtaining, by the UE, an uplink-based (UL-based) mobility specific identification (ID) as part of an uplink mobility procedure facilitating mobility of the UE in the wireless network, wherein the UL-based mobility specific ID is assigned to the UE for use in the uplink mobility procedure, and wherein the UL-based mobility specific ID is assigned to the UE from a pool of UL-based mobility specific IDs generated for the uplink mobility procedure;

receiving, by the UE, an uplink mobility reference signal acknowledgment using an alternative physical channel to a physical keep alive channel (PKACH), wherein the uplink mobility reference signal acknowledgment comprises an acknowledgment to a physical uplink measurement indication channel (PUMICH) signal or physical uplink measurement reference signal (PUMRS) transmitted by the UE; and utilizing, by the UE, the UL-based mobility specific ID for decoding signals transmitted to the UE in operation of the uplink mobility procedure.

2. The method of claim 1, further comprising:
utilizing, by the UE, the UL-based mobility specific ID to provide information for decoding at least one of a physical downlink control channel (PDCCH) or a physical downlink shared channel (PDSCH) transmitted by an access node of the wireless network in operation of the uplink mobility procedure, wherein signals of the at least one of the PDCCH or PDSCH decoded utilizing the UL-based mobility specific ID comprise random access responses (RARs) or paging signals.

3. The method of claim 1, further comprising:
obtaining, by the UE, the UL-based mobility specific ID when the UE is configured for uplink based mobility operation of the uplink mobility procedure.

4. The method of claim 3, wherein the UL-based mobility specific ID is received by the UE in a mobility configuration message of the uplink mobility procedure when the UE transits from downlink based mobility to uplink based mobility.

5. The method of claim 1, further comprising:
utilizing at least one of a physical slot format indication channel (PSFICH) or a physical downlink control channel (PDCCH) as the alternative physical channel to the PKACH.

6. The method of claim 1, further comprising:
receiving, by the UE, a paging indication carried in the alternative physical channel; and
decoding, by the UE upon detecting the paging indication carried in the alternative physical channel, a physical downlink shared channel (PDSCH) transmitted by an access node of the wireless network using the UL-based mobility specific ID.

7. The method of claim 5, wherein the uplink mobility reference signal acknowledgment is disposed in a dedicated search space of the PSFICH or the PDCCH.

8. An apparatus for providing uplink based mobility operation of user equipment (UE) operable in a wireless network, the apparatus comprising:
at least one processor; and
a memory coupled to the at least one processor, wherein the at least one processor is configured:
to obtain an uplink-based (UL-based) mobility specific identification (ID) as part of an uplink mobility procedure facilitating mobility of the UE in in the wireless network, wherein the UL-based mobility specific ID is assigned to the UE for use in the uplink mobility procedure, and wherein the UL-based mobility specific ID is assigned to the UE from a pool of UL-based mobility specific IDs generated for the uplink mobility procedure;
to receive an uplink mobility reference signal acknowledgment using an alternative physical channel to a physical keep alive channel (PKACH), wherein the uplink mobility reference signal acknowledgment comprises an acknowledgment to a physical uplink measurement indication channel (PUMICH) signal or physical uplink measurement reference signal (PUMRS) transmitted by the UE; and
to utilize the UL-based mobility specific ID for decoding signals transmitted to the UE in operation of the uplink mobility procedure.

9. The apparatus of claim 8, wherein the at least one processor is further configured:
to utilize the UL-based mobility specific ID to provide information for decoding at least one of a physical downlink control channel (PDCCH) or a physical downlink shared channel (PDSCH) transmitted by an access node of the wireless network in operation of the uplink mobility procedure, wherein signals of the at least one of the PDCCH or PDSCH decoded utilizing the UL-based mobility specific ID comprise random access responses (RARs) or paging signals.

10. The apparatus of claim 8, wherein the at least one processor is further configured:
to obtain the UL-based mobility specific ID when the UE is configured for uplink based mobility operation of the uplink mobility procedure.

11. The apparatus of claim 10, wherein the UL-based mobility specific ID is received by the UE in a mobility configuration message of the uplink mobility procedure when the UE transits from downlink based mobility to uplink based mobility.

12. The apparatus of claim 8, wherein the at least one processor is further configured:
utilize at least one of a physical slot format indication channel (PSFICH) or a physical downlink control channel (PDCCH) as the alternative physical channel to the PKACH.

13. The apparatus of claim 12, wherein the uplink mobility reference signal acknowledgement is disposed in a dedicated search space of the PSFICH or the PDCCH.

14. The apparatus of claim 8, wherein the at least one processor is further configured:
to receive a paging indication carried in the alternative physical channel; and
to decode a physical downlink shared channel (PDSCH) transmitted by an access node of the wireless network using the UL-based mobility specific ID upon detecting the paging indication carried in the alternative physical channel.

\* \* \* \* \*